3,450,718
METHOD OF PURIFYING CRUDE GRISEOFULVIN
Valjter Osvaljdovich Kuljbakh, Leningrad, Nina Abramovna Rabinovich, Moscow, and Valentina Jakovlevna Raigorodskaja, Leningrad, U.S.S.R., assignors to Leningradsky Nauchno-Issledovateljsky Institute Antibiotikov, Leningrad, U.S.S.R.
No Drawing. Filed Mar. 8, 1965, Ser. No. 438,108
Int. Cl. C07d 5/32; A01n 9/28
U.S. Cl. 260—346.2
4 Claims

ABSTRACT OF THE DISCLOSURE

An improved method of purifying griseofulvin using carbontetrachloride and methylene chloride.

---

The present invention relates to a method of purifying the antibiotic, griseofulvin, which is known for its antifungal activity, and more particularly, to a method of purifying crude griseofulvin.

It is known that by the use of non-selective solvents, crude griseofulvin obtained by known methods is characterized by low yield and low content of the basic substance: when using butylacetate 75% and 79.5% [British Pat. 784,618 (1957)], trichloroethylene 80% and 80–92% [British Pat. 795,039 (1958)], aqueous acetone 73–82% and 70–90% [R. S. C. Aytoun and A. C. Best, The Industrial Chemist, vol. 38, No. 445, pp. 107–108, (1962)].

Production of the medicinal preparation, the purity of which must meet pharmacopoeia specifications, necessitates time- and labor-consuming purification, involving considerable losses of the valuable product. Thus, extraction with butylacetate requires mixing the crude product with a suitable solvent and repeated filtration to remove oily impurities adhering to the crystals, for which purpose use is made of poorly suitable explosive and toxic acetone [British Pat. 902,629], butylacetate [Federal German Pat. 1,018,588] and the narcotic, chloroform [British Pat. 784,618], as well as repeated precipitation from acetone solution with water, which gives only 95% purity of the antibiotic [cf. British Pat. 784,618].

When extracting with aqueous acetone, highly impure, light reddish-brown to red, crude antibiotic requires, as is stated in the article by Aytoun and Best, complicated purification comprising washing with toxic and flammable methanol or a methanol-kerosene mixture, and absorbing impurities with activated charcoal. Since this method of purification is inefficient when applied commercially on an industrial scale, it is followed by absorption with aluminium oxide, precipitation from solution with water, washing the crystals with acetone, repeated crystallization and precipitation [cf. British Pat. 902,629 (1962)]. Nevertheless, the purity of the preparation obtained does not exceed 98.5–99% [British Pat. 902,629 (1962)]. Consequently, the yield of griseofulvin purified in this way does not exceed 58% when using butylacetate [British Pat. 784,618 (1957)], 60% when using trichloroethylene [British Pat. 795,039 (1958)], and 60% when using aqueous acetone [British Pat. 902,629 (1962)].

Brian endeavored to overcome the aforesaid difficulties by using dimethylformamide which is a good solvent for griseofulvin, giving solutions containing 14–16% of the antibiotic, but was unsuccessful because of the difficulty of obtaining dimethylformamide, as well as its high cost and complete miscibility with water (cf. the aforementioned article by Aytoun and Best).

To sum up, all known methods of isolating the crude product and purifying it so as to meet the pharmacopoeia specifications for an antibiotic which is to be used for lengthy oral administration and which must be non-toxic, are based, because of the large amount of other substances synthesized by molds of the genus Penicillium along with griseofulvin, many of them highly toxic (e.g. patulin, mycelianamide, 6 - methylsalicylic acid, and others), on the use of at least two and in most cases three or even four extractants of different chemical nature.

Thus, according to British Pat. 784,618 or 795,039, four solvents are used: butylacetate or trichloroethylene, chloroform, acetone or alcohol, and water; according to British Pat. 902,629 four solvents are also used: acetone, water, methanol, and a kerosene mixture; according to U.S. Pat. 3,160,640, three solvents are used: methylene chloride, petroleum ether and acetone, or in the case of less contamination of the crude product with antifoam agent, two solvents: methylene chloride and acetone.

As follows from the known patent and scientific literature on the production of griseofulvin, because of high content of other toxic by-products and coloring matter of phenolic character, purification does not always produce the desired effect, or is achieved with great difficulty after repeated changes of solvents and multiple crystallization (with the exception of the method of U.S. Pat. 3,160,640) which involves considerable loss of costly solvents and results in a low yield of the medicinal preparation, not exceeding 60% (cf. British Pat. 784,618, 795,039, and 902,629).

It follows that all prior attempts to overcome the aforesaid difficulties and disadvantages were unsuccessful, but we have succeeded in solving this problem and bringing it to practical realization.

The object of the present invention is to provide a method of producing griseofulvin of high purity, thus improving the quality of the medicinal preparation intended for lengthy oral administration. Another object of this invention is to provide a more economic and efficient method of purifying griseofulvin.

It is also an object of this invention to provide a safer process of crystallizing crude griseofulvin in order to improve the working conditions of the personnel.

In accordance with the said and other objects, the invention comprises a new method of purifying crude griseofulvin and a combination of preliminary washing to remove oily impurities by means of an incombustible solvent which does not dissolve griseofulvin, and subsequent crystallization from the highly selective solvent, methylene chloride, while using clarifying acid wood charcoal. It will be understood that there may be modifications in the embodiment of the invention described herein within the scope of the invention without departing from the spirit of the invention.

It has now been established that because of the exceedingly high selectivity of methylene chloride and its high dissolving power in respect to griseofulvin, making it possible to obtain a 10–12% solution of the antibiotic, which properties were disclosed by us, it can effectively be used not only as an extractant of griseofulvin from the mycelium and culture fluid resulting from its higher permittivity and the lower solubility of water in it, said water hampering desorption of water-insoluble substances, but also as a solvent for the crystallization of crude griseofulvin.

Broadly, the object of this invention is to obtain the antibiotic griseofulvin approaching chemical purity by using practically incombustible methylene chloride as a solvent for crystallizing the crude product, while using an incombustible organic solvent for oily impurities which practically does not dissolve griseofulvin, for preliminary washing of the crystals of the crude product.

The use of a selective solvent having a low dissolving power in respect to water (0.1 g. per 100 g. methylene chloride) makes it possible to obtain by a single crystallization a practically ash-free preparation having a sulfated ash content of less than 0.2% and with a minimum moisture content of less than 1% and with a content of the basic substance in the dry preparation exceeding 99.5% according to polarimetric and spectrophotometric determinations.

In accordance with a preferred embodiment of the method, the crystals of crude griseofulvin obtained by the method described in U.S. Patent 3,160,640 are preliminarily washed with a small amount of an incombustible organic solvent, preferably carbon tetrachloride, to dissolve the residual oily impurities without dissolving griseofulvin, dissolved in dry, distilled methylene chloride (1:10) and, after adding 0.5% of dry acid clarifying wood charcoal, warmed on a water-bath at 35° C. in an apparatus with reflux condenser to 25° C. and filtered through a water-heated pressure filter at 35° C. into a crystallizer with condenser. In order to isolate griseofulvin, accelerate crystallization and increase the direct yield, the filtrate is either evaporated until the beginning of crystallization occurs and then cooled to 15° C., or else cooled to 0° C. without evaporating. The crystals are separated by means of a centrifuge and dried first in a vacuum-drier at 25° C. and a pressure of 15 mm. Hg to remove methylene chloride from the molecular solvate compound formed and then in an atmospheric drier at 70° C. to eliminate the fungous odor. A pharmacopoeia preparation in the form of a white fine-crystalline powder is obtained, the yield coming to 93% of the content in the crude product, including extraction from mother liquors or 88% of the content in the mycelium. The content of the basic substance in the medicinal preparation obtained is not lower than 98.5% as determined by the spectrophotometric method, the specific rotation not less than 341.8°, the ash content (sulfated) not higher than 0.2%, the moisture content not higher than 1%, and the melting point 218–222° C. (over a range of 2° for each sample).

The invention has the special object of providing a method of obtaining the antibiotic griseofulvin in a high degree of purity, suitable for lengthy oral administration in treating superficial mycosis.

Broadly, the invention comprises a method of obtaining griseofulvin in a high degree of purity and of high yield by purifying crude griseofulvin by washing off oily impurities with an incombustible organic solvent, selective in respect to said impurities but not dissolving griseofulvin, with subsequent crystallization from methylene chloride, a highly selective, practically incombustible solvent which dissolves almost no water, followed by clarification with charcoal.

In the preferred embodiment of the invention carbon tetrachloride, which practically does not dissolve griseofulvin, is used as the incombustible organic solvent, while clarification of the methylene chloride solution of griseofulvin is carried out with acid wood charcoal, which ensures sorption of the phenolic coloring matter, after which the filtrate is partially evaporated in a crystallizer until crystallization sets in (to a pasty consistency).

For a better understanding of this invention by those skilled in the art, the following examples are given by way of illustration.

Example 1

4 kg. of crude griseofulvin containing 95% of the basic substance are mixed in an enameled apparatus with 6 litres of carbon tetrachloride for 30 minutes. The mass is filtered on a vacuum filter and washed on the filter with 1 liter of $CCl_4$; the washed and pressed-out crude product is dissolved by warming with 40 liters of distilled methylene chloride to 25° C. in an enameled apparatus with reflux condenser, the temperature of the water-bath being 35° C., and after adding 200 g. of acid activated charcoal stirred for an hour. The solution is filtered through a water-heated (35° C.) pressure filter into a water-heated (55° C.) evaporator and evaporated at 38–40° C. to a pasty consistency. The mass obtained is crystallized by cooling to 15° C., pressed out on a pressure filter and dried in a vacuum drying-oven at 25° C./15 mm. for 24 hrs. The yield of pure griseofulvin is 3.53 kg. or 93% of the content in the crude product.

Example 2

3 kg. of crude griseofulvin containing 95% of the basic substance are mixed in an enameled apparatus with 4.5 liters of $CCl_4$ for 30 min. The mass is filtered on a vacuum filter and washed with 0.7 liter of $CCl_4$. The washed and pressed-out crude product is dissolved in 30 liters of distilled methylene chloride and, after adding 150 g. of acid activated wood charcoal, stirred for an hour. The solution is filtered through a pressure filter into an enameled evaporator and evaporated at 38–40° C. until crystals begin to form. The solution obtained is poured into a crystallizer, which is cooled with a freezing mixture, where crystals of pure griseofulvin form at 0° C. They are filtered off on a pressure filter, while the mother liquor is again clarified with charcoal (if necessary), filtered, evaporated and crystallized.

The yield of pure griseofulvin is 2.64 kg. or 93% of the content in the crude product.

The present invention is applied, in particular, in the antibiotic industry for producing the only effective, orally administered antibiotic for treatment of widely occurring superficial mycosis in man and animals caused by dermatophyte fungi—microspora, trichophytons, epidermophytons, and achorions—and also used in agriculture as a fungicide against a number of phytopathogenic fungi.

It should be noted that the present invention ensures high, almost chemical purity of the preparation, due to the superior desorption characteristics of methylene chloride, a fact we have disclosed, as compared to acetone and alcohol, solvents which are miscible with water in all proportions.

Formation of crystallohydrates with griseofulvin by these solvents, which unlike methylene chloride are miscible with water, hampers complete removal of the said solvents and residual moisture by drying the crude product and the final preparation, and also hampers obtaining an ash-free antibiotic with a minimum moisture content.

The superior desorption characteristics of methylene chloride in respect to griseofulvin are due to the lower surface tension and high permittivity of the water-saturated solvent and to the extremely low solubility of water in said solvent, which, unlike acetone and alcohol, ensures a better solubility of the water-insoluble crude product and makes it possible to remove water-soluble impurities by crystallization from methylene chloride and obtain a white practically ash-free preparation as a result of the single operation of clarifying with acid charcoal.

The high and selective solubility of griseofulvin in methylene chloride (100 mg./ml.) discovered by us makes it possible to reduce to one-fourth the volume of the solvent and apparatus required for crystallizing and distilling off the solvent and to increase yield by stages to 93% and total yield to 88%, i.e., a 50 percent increase over known methods, as well as to unify the extractant and solvent, which greatly simplifies and improves production techniques and reduces the explosion hazard. Only the combination of the essentially new technique comprising preliminary washing of oily impurities from crude griseofulvin with an incombustible organic solvent which does not dissolve griseofulvin, preferably carbon tetrachloride, crystallization of the washed crude product from the optimum solvent found by us which is highly selective in respect to griseofulvin, said crystallization being performed after clarifying with acid charcoal, and said crude material being isolated according to application No. 143,014 made in the United States on Sept. 29, 1961, now U.S. Patent 3,160,640, ensures production of a medicinal preparation of unsurpassed purity unprecedented for natural antibiotics produced commercially.

Thus, the essential novelty of the proposed chemical method of purifying crude griseofulvin lies in obtaining a medicinal preparation of heretofore unattained high degree of chemical purity. This is achieved by washing off impurities, which lower the melting point of griseofulvin, with carbon tetrachloride and by crystallizing griseofulvin from methylene chloride, an exceptionally high selective solvent in respect to griseofulvin, which ensures complete separation of water-soluble substances, and clarifying with acid activated wood charcoal for simultaneous removal of pigments and phenolic impurities. Complete removal of impurities is shown by dissolving the preparation in concentrated sulfuric acid: the intensity of the yellow coloration does not exceed that of the standard (0.01 g./ml. $K_2Cr_2O_7$). This test proposed by us is highly sensitive to traces of impurities, like the specific rotation value of a 1% acetone solution.

Moreover, the invention provides a method of chemical purification of griseofulvin, which is free from fire-hazard, while reducing the volume of the equipment required as compared to precipitation methods heretofore practised, obviating the necessity of rectifying water-alcohol mixtures or aqueous acetone.

The proposed method of chemical purification of griseofulvin ensures obtaining the individual, biologically and optically acetive compound (+) griseofulvin, which is fully characterized by the maximum absorption values and extinction in the ultraviolet region, combined with a specific rotation of $[\alpha]^D_{20} = +341.8-347°$, and also by the melting point of most industrial preparations of 220–222° C., over a range of 0.5–1°.

When white mice weighing 18–22 g. were given 250 times the therapeutic dose in a single oral administration, the preparation proved to be non-toxic.

Finally, it should be pointed out that in developing this simple and original method of chemical purification of crude griseofulvin we proceeded from the heretofore unknown unlike solubility of griseofulvin in methylene chloride and carbon tetrachloride disclosed by us, and the similar solubility of oily impurities in these chloroorganic solvents, as well as the possibility of absorbing impurities in phenolic form on acid charcoal.

In addition, the invention provides a new more progressive method of chemical purification of crude griseofulvin, ensuring high quality, low cost and safety of production of this valuable, highly effective antibiotic without which the arsenal of medicines is today inconceivable, and which has played a role in the therapy of superficial mycosis similar to that once played by penicillin in the treatment of coccal infections.

Although this invention has been described in a preferred embodiment it will be understood that there may be changes and modifications without departing from the spirit and scope of the invention, as will be apparent to those skilled in the art. These changes and modifications are to be understood as not departing from the spirit and scope of the invention and the appended claims.

What we claim is:

1. A method for purifying crude griseofulvin, said method comprising washing griseofulvin which contains oily and insoluble impurities with carbon tetrachloride which dissolves said oily impurities without dissolving griseofulvin to remove said oily impurities therefrom, dissolving the griseofulvin from which oily impurities have been removed in methylene chloride which does not dissolve the insoluble impurities and crystallizing the thusly dissolved griseofulvin.

2. A method according to claim 1, wherein washing is effected with about 1.5 volumes of carbon tetrachloride based on the crude griseofulvin and the griseofulvin is dissolved in about 10 volumes of methylene chloride.

3. A method according to claim 2, wherein the crystallizing is effected at a temperature of at most 15° C.

4. A method according to claim 3 comprising adding charcoal to the griseofulvin dissolved in methylene chloride to absorb color impurities thereon.

References Cited

UNITED STATES PATENTS 3,160,640  12/1964  Coolbach et al. \_\_\_\_ 260—346.2

ALEX MAZEL, *Primary Examiner.*

B. I. DENTZ, *Assistant Examiner.*

U.S. Cl. X.R.

260—999